United States Patent
Ho et al.

(10) Patent No.: US 8,433,756 B2
(45) Date of Patent: Apr. 30, 2013

(54) MULTIPLE TERMINAL COLLABORATION SYSTEM

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 1170 days.

(21) Appl. No.: 11/537,803

(22) Filed: Oct. 2, 2006

(65) Prior Publication Data
US 2008/0082608 A1    Apr. 3, 2008

(51) Int. Cl.
G06F 15/16    (2006.01)

(52) U.S. Cl.
USPC .......................................... 709/205; 709/204

(58) Field of Classification Search .................... 709/205
See application file for complete search history.

(56) References Cited

U.S. PATENT DOCUMENTS

| | | | |
|---|---|---|---|
| 5,909,543 A * | 6/1999 | Tanaka et al. | 709/204 |
| 6,195,091 B1 * | 2/2001 | Harple et al. | 715/751 |
| 6,584,493 B1 * | 6/2003 | Butler | 709/204 |
| 7,237,004 B2 * | 6/2007 | Slobodin et al. | 709/204 |
| 7,362,349 B2 * | 4/2008 | Nelson et al. | 348/14.08 |
| 7,421,469 B1 * | 9/2008 | Liu et al. | 709/204 |
| 7,478,126 B2 * | 1/2009 | Prohel et al. | 709/204 |
| 2002/0055973 A1 * | 5/2002 | Low et al. | 709/204 |
| 2002/0194272 A1 * | 12/2002 | Zhu | 709/204 |
| 2004/0103152 A1 * | 5/2004 | Ludwig et al. | 709/205 |
| 2004/0239754 A1 * | 12/2004 | Shachar et al. | 348/14.08 |

FOREIGN PATENT DOCUMENTS

WO    WO 03034235 A1 *   4/2003

* cited by examiner

*Primary Examiner* — Krista Zele
*Assistant Examiner* — Esther Benoit
(74) *Attorney, Agent, or Firm* — Timothy X. Gibson, Esq.; Gibson & Dernier LLP

(57) ABSTRACT

Systems and methods relate to collaboration systems having multiple terminals per user. The collaboration system may include first and second collaboration agents, where the first collaboration agent is operable to transmit over a telecommunications network a collaboration call invitation from a first user first terminal associated with the first collaboration agent to a second user first terminal associated with a second collaboration agent; to connect a first communication session if the second user first terminal accepts the collaboration call invitation; to transmit a collaboration call handle to at least the first user first terminal and a first user second terminal associated with the first collaboration agent; to transmit a collaboration command from the first user second terminal to a second user second terminal associated with the second collaboration agent; and to connect a second communication session between the first user second terminal and the second user second terminal.

28 Claims, 4 Drawing Sheets

MULTIPLE TERMINAL COLLABORATION SYSTEM

BACKGROUND

1. Field of Invention

This invention relates generally to communications, particularly to a collaboration system with multiple terminals.

2. Description of Related Art

Collaboration refers to processes wherein people work together to develop an idea, create a design, or generally achieve a shared goal. In a local environment, people collaborate in the confines of a cubicle, an office or a conference room, using tools such as a whiteboard, flip-charts, or a projector to share data information while exchanging ideas in a face-to-face fashion.

In the new economy of multi-national corporations, mobile work forces, home offices, outsourcing and globalization, remote collaboration becomes increasingly critical to the vitality of businesses.

Remote collaboration naturally begins with a telephone call. Oftentimes during the telephone conversation, a participant wants to send a document to others so they can continue their conversation over the document. In one example, a product manager wants to present a product proposal to his customer. In another example, a project manager wants to share an up-to-date schedule spreadsheet with her product development manager. In one example, a fashion designer wants to share a preliminary drawing of the summer fashion line with his advisor. In a further example, two software engineers want to discuss a piece of programming code.

There are many existing tools for collaboration, ranging from telephone, email, instant messaging, to elaborated integrated solutions such as the Microsoft Netmeeting, Skype, or Yahoo Messenger.

In one example, a manager uses her desktop telephone to call a human resource representative to discuss salary merit increases for the upcoming fiscal year. During the discussion, the human resource representative wants to share a document having a competitive salary analysis with the manager. The human resource representative sends the document as an email attachment. They have to wait until the manager receives the email before they can discuss the details of the document.

In another example, a hardware designer uses NetMeeting to discuss a prototype schematic with his manager. He calls the manager over the phone, to ask her to run the NetMeeting application on her personal computer, and log on to the corporate network. In the mean time, the hardware engineer will have to wait until his manager is ready.

In one embodiment, Jack, a salesperson, visits a customer. Jack calls a product manager in the corporate office about closing a deal with the customer. During discussion, the product manager wants to send Jack an updated price list through Yahoo Instant Messaging (IM) service. Jack has to log on to Yahoo IM service and start an instant messaging session with the product manager.

These tools, despite their respective functionalities, do not address the natural usage of collaboration which begins with a telephone call, and proceeds with other collaboration functions such as sharing a document.

Therefore, there is a need for a system to provide functionalities conforming to the natural progression of collaboration.

SUMMARY OF THE INVENTION

In accordance with one or more embodiments of the present invention, systems and methods relate to collaboration systems having multiple terminals per user. The collaboration system may include first and second collaboration agents, where the first collaboration agent is operable to transmit over a telecommunications network a collaboration call invitation from a first user first terminal associated with the first collaboration agent to a second user first terminal associated with a second collaboration agent; to connect a first communication session if the second user first terminal accepts the collaboration call invitation; to transmit a collaboration call handle to at least the first user first terminal and a first user second terminal associated with the first collaboration agent; to transmit a collaboration command from the first user second terminal to a second user second terminal associated with the second collaboration agent; and to connect a second communication session between the first user second terminal and the second user second terminal.

According to one or more embodiments of the present invention, a method of collaborating using a telecommunications system may include transmitting a collaboration call invitation from a first user first terminal associated with the system to a second user first terminal associated with the system; connecting a first communication session if the second user accepts the collaboration call invitation; transmitting a collaboration call handle to at least the first user first terminal and a first user second terminal associated with the system; transmitting a collaboration command from the first user second terminal to a second user second terminal associated with the system; and connecting a second communication session between the first user second terminal and the second user second terminal.

According to one or more embodiments of the present invention, a system for collaborating between a first user and a second user using a telecommunications network may include a first collaboration platform and a second collaboration platform; wherein the first collaboration platform includes a first user first terminal, a first user second terminal, and a first collaboration agent; and a second collaboration platform includes a second user first terminal, a second user second terminal, and a second collaboration agent.

According to one or more embodiments of the present invention, a product of the present invention may include a computer program product tangibly stored on a computer usable medium and containing instructions operable to cause a computer to perform a method in accordance with the present invention.

The advantages of this invention are best understood after reading the detailed technical description, and in relation to existing collaboration processes. Nonetheless, some of the advantages include a more natural flow of collaboration being with a phone call; a more user-friendly form of spontaneous collaboration involving exchange of data, including electronic documents, images and video; and a combination of collaboration functionalities that hopefully make collaborating easier, more effective and more efficient.

Other aspects, features, advantages, etc. will become apparent to one skilled in the art when the description of the invention herein is taken in conjunction with the accompanying drawings.

BRIEF DESCRIPTION OF DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the issued claims. The drawings may not be to scale, and the aspects of the drawings may not be to scale relative to each other.

FIG. 3 is a flow diagram illustrating actions that may be carried out to perform a collaboration call process in accordance with one or more embodiments of the present invention.

DETAILED DESCRIPTION

Figure 1A:
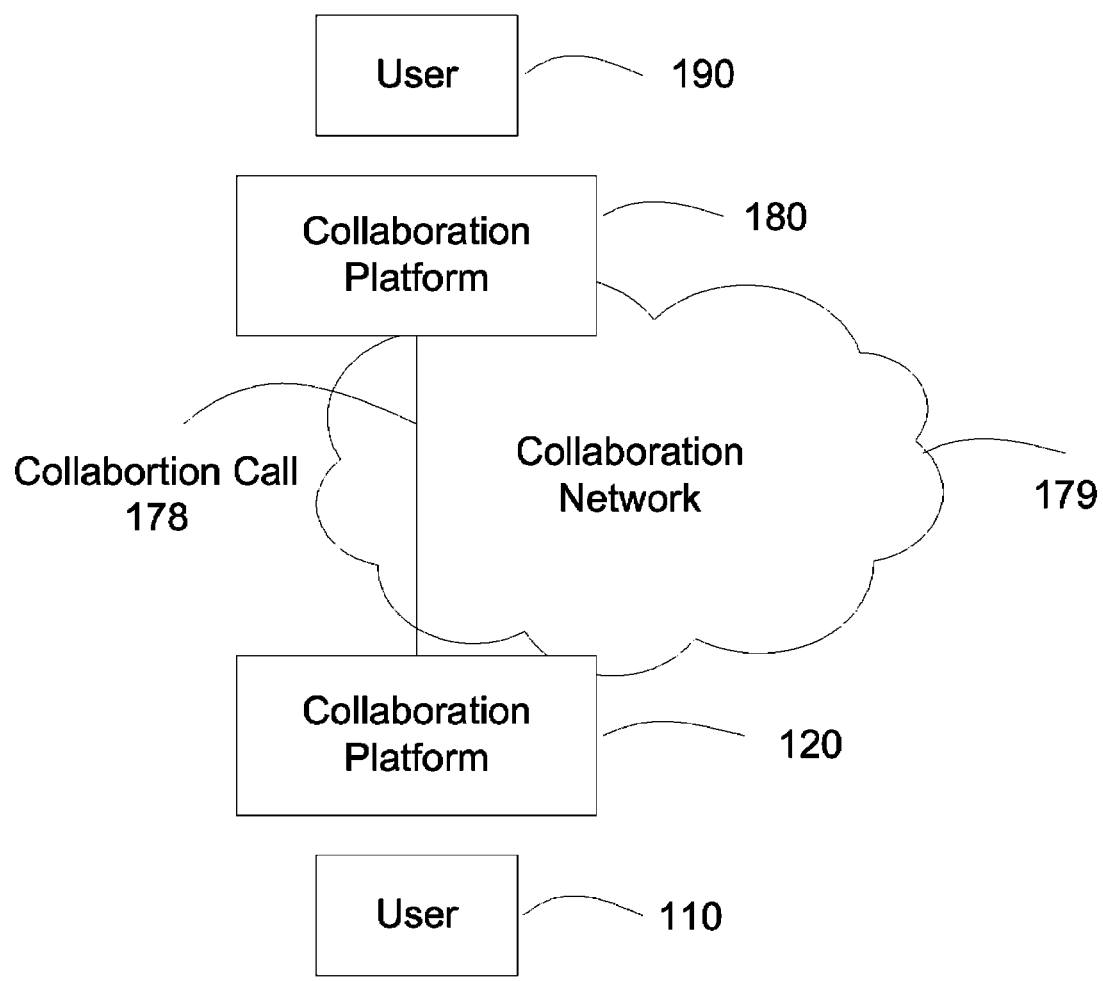
FIG. 1A is a block diagram illustrating a system for collaboration in accordance with one or more embodiments of the present invention.

Referring to FIG. 1A, a block diagram illustrates a telecommunications system 100 for collaboration. A telecommunications collaboration system 100 may include a collaboration network 179 having collaboration platforms 120 and 180. Collaboration platform 120 may allow a first user 110 to collaborate with a second user 190 using collaboration platform 180.

Exemplary embodiments of collaboration network 179 may include, for instance, a voice network, such as a Voice over IP (VoIP) network; an Instant Message (IM)-based voice network; a corporate voice network; or a Public Switched Telephone Network (PSTN). Other embodiments of a collaboration network 179 may include, as well, for instance, a data network, such as the Internet; a service provider data network; a corporate data network; or a corporate virtual private network (VPN).

Collaboration may arise in almost any context and for almost any reason. Commonly, however, user 110 may collaborate with user 190 for a business purpose, such as negotiating a contract, designing a fashion line, solving a field problem, brainstorming a marketing strategy, or finalizing a financial settlement.

Collaboration platform 120 may provide a plurality of collaboration functionalities. In one embodiment, a collaboration functionality may include a conversational functionality. User 110 may use the conversational functionality to talk with user 190. In one embodiment, a collaboration functionality may include a document exchange functionality. User 110 may use the document exchange functionality to share a document with user 190. In one embodiment, the document exchange functionality may include sending, receiving, or displaying the document.

User 110 and user 190 may collaborate over a collaboration call 178 between collaboration platform 120 and collaboration platform 180. Collaboration call 178 may include a voice communication session. User 110 may talk with user 190 over the voice communication session. Collaboration call 178 may include a data communication session. User 110 may send or receive a document over the data communication session. In one embodiment, users 110 and 190 may converse while exchanging a document.

Figure 1B:
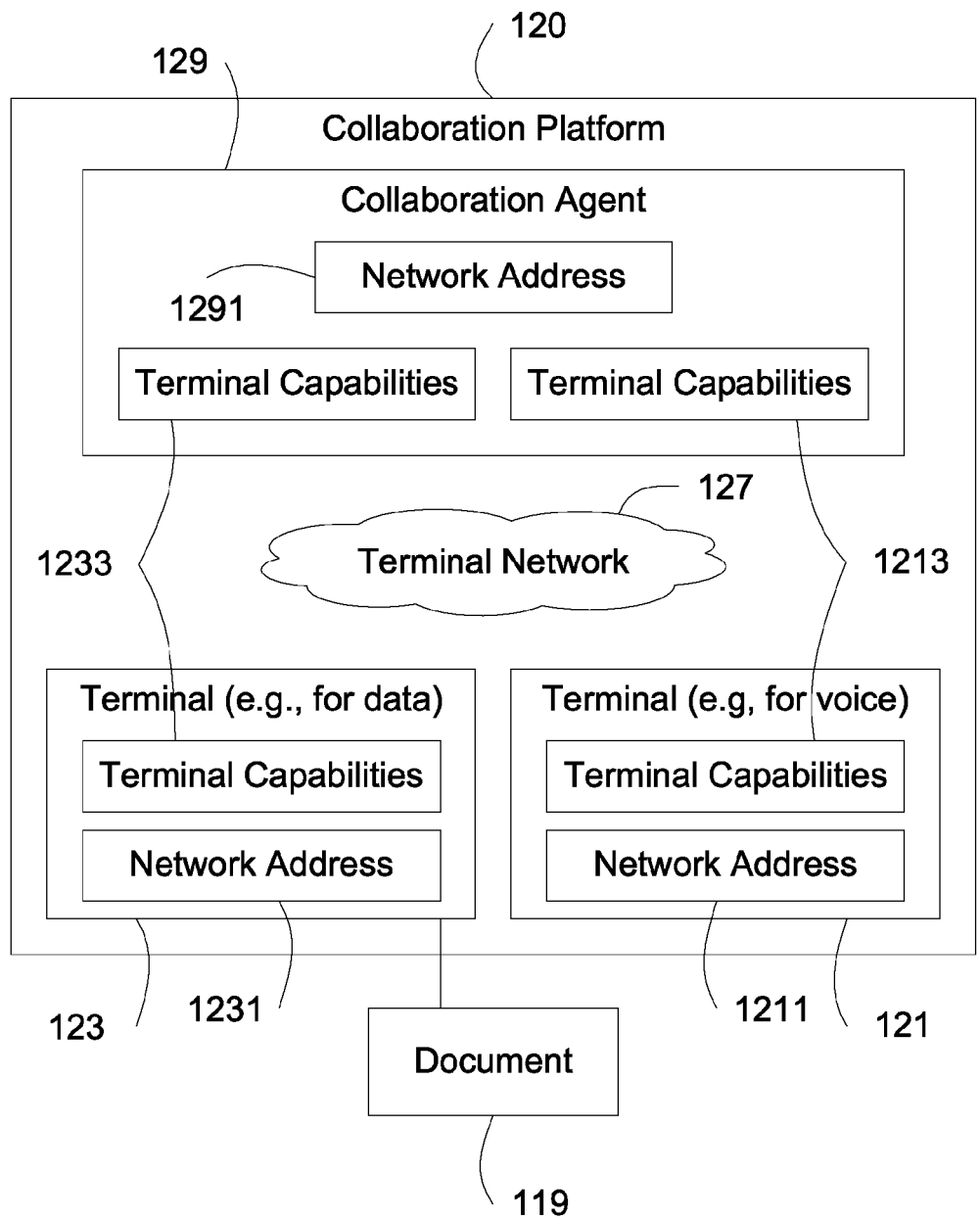
FIG. 1B is a block diagram illustrating an exemplary collaboration platform in accordance with one or more embodiments of the present invention.

Referring to FIG. 1B, a block diagram illustrates an exemplary collaboration platform 120, 180. Collaboration platform 120 may include a collaboration agent 129 and at least two terminals 121, 123. Collaboration agent 129 and terminals 121 and 123 may communicate over a terminal network 127.

Terminal network 127 may provide voice transport capabilities and data transport capabilities. In one embodiment, terminal network 127 may include an Internet Protocol (IP) network. In one embodiment, the voice transport capabilities may enable a Voice over IP (VoIP) call. In one embodiment, the voice transport capabilities may enable an Instant Message (IM)-based voice call. In one or more embodiments, terminal network 127 may include the Internet; a General Packet Radio Service (GPRS) network; a service provider terminal network; a corporate data network; or a corporate virtual private network (VPN). In another embodiment, terminal network 127 may include a cellular network, such as a CDMA2000 network; a Wideband Code Division Multiple Access (W-CDMA) network; a third-generation (3G) network; a CDMA 1x Evolution-Data Optimized (1xEV-DO) network; a High-Speed Downlink Packet Access (HSDPA) network; or an Enhanced Data Rates for GSM Evolution (EDGE) network. In a further embodiment, terminal network 127 may include a wired network, such as an Ethernet; or a wireless network, such as a Wi-Fi network. In one embodiment, terminal network 127 may include a system bus. In an additional embodiment, terminal network 127 may include an application programming interface (API).

Terminal 121 and terminal 123 are two separate computing devices. Terminal 121 may include a network interface module associated with network address 1211. In one embodiment, network address 1211 may include an IP address. In another embodiment, network address 1211 may include a system bus address. In a further embodiment, network address 1211 may include a functionality name. Terminal 121 may use network address 1211 to communicate with collaboration agent 129. Similarly, terminal 123 may include a network interface module associated with network address 1231. Network address 1211 differs from network address 1231.

Collaboration agent 129 may include a network interface module associated with network address 1291. Using network addresses 1291, collaboration agent 129 may communicate with terminal 121, via network address 1211, and/or terminal 123, via network address 1231. Terminals 121 and 123 may provide a user interface to user 110 to access one or more collaboration functionalities in furtherance of the communication between collaboration agent 129 and terminal 121, 123.

Terminal 121 may include voice capabilities that support the conversational functionality. For instance, terminal 121 may include voice processing capabilities, such as conversion of voice signals between analog and digital; conversion between different digital voice signals; compressing and decompressing digital voice signals; jitter buffer management; or voice activity detection. Terminal 121 may include voice network capabilities for establishing a voice communication session, and for sending and receiving voice signals over the voice communication session. Terminal 121 may include a voice output device, such as a speaker, and a voice input device, such as a microphone. Terminal 121 may include an input device, such as a dial pad, a stylus, or navigation keys for user 110 to make or receive a collaboration voice call.

Terminal 121 may include terminal capabilities list 1213. Terminal capabilities list 1213 may describe the voice capabilities of terminal 121. In one embodiment, terminal capabilities list 1213 may include a description of voice networking capabilities for transmitting and receiving voice signals over terminal network 127. In another embodiment, terminal capabilities list 1213 may include a description of voice processing capabilities, such as media transfer protocols; supported codecs; data transfer frame rates; jitter buffer parameters; and/or voice encryption methods. In a further embodiment, terminal capabilities list 1213 may include speaker and/or microphone specifications, such as dynamic range or frequency range.

In one or more embodiments, terminal 121 may include, for instance, a desk phone, a corporate desk phone, a cellular phone, a video phone, a smart-phone, an IP-phone, a customer service representative (CSR) terminal, or voice conferencing equipment.

Terminal 123 may include data capabilities that support the document exchange functionality. Terminal 123 may include data network capabilities for establishing a data communication session and for sending and receiving a document 119 over the data communication session. In one embodiment, document 119 may include a text document. In another embodiment, document 119 may be a spreadsheet. In a further embodiment, document 119 may be a PowerPoint presentation. In an additional embodiment, document 119 may include a media file, such as an image, a video clip, or a voice file. In one embodiment, terminal 123 may include a display, such as a graphical display screen for displaying document 119. In another embodiment, terminal 123 may include document processing capabilities, such as editing, or encrypting/decrypting document 119. In a further embodiment, terminal 123 may include an input device, such as a keyboard, a mouse, a touch-screen or a stylus for user 110 to select, send, receive, display or edit document 119.

Terminal 123 may include terminal capabilities list 1233. Terminal capabilities list 1233 may describe the data capabilities of terminal 123. In one embodiment, terminal capabilities list 1233 may include a description of data network capabilities for transmitting and receiving documents over a terminal network. In another embodiment, terminal capabilities list 1233 may include a description of data processing capabilities, such as supported protocols for document transfer; document encryption methods; or supported document types. In a further embodiment, terminal capabilities list 1233 may include display characteristics, such as display screen size, display resolution, or display color depth.

In one or more embodiments, terminal 123 may be a computer, a personal desktop computer, a laptop computer, a Personal Data Assistant (PDA), a smart-phone, a point-of-sale (POS) terminal, an automated teller machine, a computer-aided vending machine, a computer-aided kiosk, or a data conferencing equipment.

Collaboration agent 129 may include terminal capabilities list 1213 and terminal capabilities list 1233. In one embodiment, collaboration agent 129 may obtain terminal capabilities list 1213 from terminal 121, and/or list 1233 from terminal 123. Collaboration agent 129 may select a terminal to handle a collaboration functionality during collaboration call 178 based on terminal capabilities lists 1213, 1233. In one embodiment, collaboration agent 129 may select terminal 121 to handle the conversational functionality based on terminal capabilities list 1213, while terminal 123 is selected to handle the document exchange functionality, based on terminal capabilities list 1233.

Figure 2:
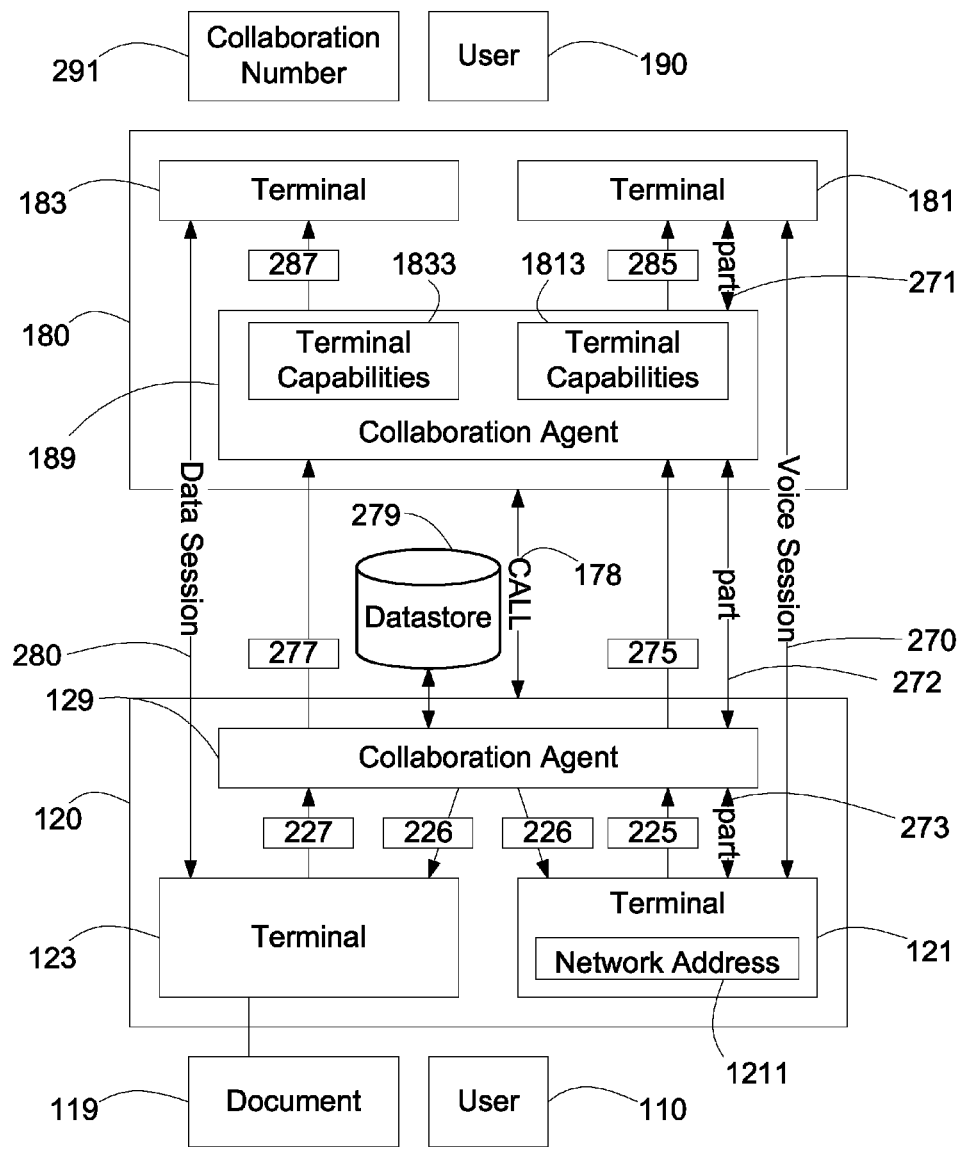
FIG. 2 is a block diagram illustrating data flow between collaboration components during a collaboration call in accordance with one or more embodiments of the present invention.

Referring to FIG. 2, a block diagram illustrates data flow between collaboration components during a collaboration call 178. Collaboration platform 120 may include collaboration agent 129, terminals 121 and 123. Terminal 121 may include voice capabilities that support conversational functionality. Terminal 123 may include data capabilities that support document exchange functionality. Terminal 121 may include network address 1211.

Collaboration platform 180 may include collaboration agent 189, terminals 181 and 183. Terminal 181 may include voice capabilities that support conversational functionality. Terminal 183 may include data capabilities that support document exchange functionality. Collaboration agent 189 may include terminal capabilities list 1813 for terminal 181 and terminal capabilities list 1833 for terminal 183.

Although depicted as having two separate collaboration platforms 120 and 180, collaboration platforms 120 and 180 in actuality may be one collaboration platform interfacing with two separate users 110 and 190. The system 100 is not limited to situations where collaboration occurs between two distinct users 110 and 190 associated with two distinct platforms 120 and 180. In fact, the situation often may arise, such as between co-workers at a company office complex, where both users 110 and 190 are associated with the same collaboration platform 120 and their terminals 121, 123, 181, and 183 are associated with a single collaboration agent 129.

Referring to FIG. 3, a flow diagram illustrates actions that may be carried out to perform a collaboration call process 300 in accordance with one or more embodiments of the present invention. An exemplary collaboration call process 300 may include some or all of the enumerated actions. Portions of the data flow for actions associated with process 300 are illustrated in FIG. 2.

The following actions outline collaboration call process 300:

In action 302 of process 300, user 110 may use collaboration platform 120 to initiate a collaboration call 178 to collaboration platform 180 used by user 190. In one embodiment, user 110 may initiate collaboration call 178 using the conversational functionality. In one embodiment, user 190 may have a collaboration number 291. The collaboration number 291 may include a network address for terminal 181. In one embodiment, collaboration number 291 may be a telephone number. Moreover, the telephone number may correspond to the network address for terminal 181. In another embodiment, collaboration number 291 may be a user name. In a further embodiment, collaboration number 291 may be an employee number. In an attempt to communicate with user 190, user 110 may input collaboration number 291 using terminal 121.

In action 304, terminal 121 may compose and send a collaboration invitation 225 for collaboration call 178. Composing may include taking available information and packaging it in a format usable to a recipient computer. The available information may include both information input by the user 110, as well as information known to the composing terminal 121. Collaboration invitation 225 may include collaboration number 291. In one embodiment, collaboration invitation 225 may include network address 1211. Terminal 121 may send collaboration invitation 225 to collaboration agent 129.

In action 306, collaboration agent 129 may receive and process collaboration invitation 225 from terminal 121. Collaboration agent 129 may extract network address 1211 and collaboration number 291 from collaboration invitation 225. Based on collaboration number 291, collaboration agent 129 may determine collaboration agent 189 as the destination of collaboration call 178.

In action 308, according to one embodiment, collaboration agent 129 may connect and consult with a datastore 279. In one embodiment, datastore 279 may include, for instance, memory, flash memory, or a hard disk. In another embodiment, for example, datastore 279 may include a database. Datastore 279 may include a plurality of collaboration numbers wherein each collaboration number, e.g., number 291, may be associated with a collaboration agent, e.g., agent 189. In this illustration, datastore 279 may include collaboration number 291 and associated collaboration agent 189. Collaboration agent 129 may search for collaboration number 291 within the datastore 279 and identify collaboration agent 189 as the intermediate destination of collaboration call 178.

In action 310, collaboration agent 129 may compose and send a collaboration invitation 275. Collaboration invitation 275 may indicate that conversational functionality is requested. Collaboration invitation 275 optionally may include network address 1211. Collaboration agent 129 may send collaboration invitation 275 to collaboration agent 189.

In action 312, collaboration agent 189 may receive and process collaboration invitation 275. Based on the indicated conversational functionality in collaboration invitation 275, collaboration agent 189 may select terminal 181 based on terminal capabilities list 1813.

In action 314, collaboration agent 189 may compose and send a collaboration invitation 285. In one embodiment, collaboration agent 189 may extract network address 1211 from collaboration invitation 275 and include network address 1211 into a collaboration invitation 285. Collaboration agent 189 may send collaboration invitation 285 to terminal 181.

In action 316, terminal 181 may receive and process collaboration invitation 285. In one embodiment, terminal 181 may extract network address 1211 from collaboration invitation 285 and notify user 190 of the incoming collaboration invitation 285.

Although the collaboration invitations 225, 275 and 285 are addressed individually for purposes of describing the details of process 300, collaboration invitations 225, 275, and 285 may be conceptualized as first, second and third parts of one collaboration invitation sent from terminal 121 to terminal 181, passing through collaboration agents 129 and 189. Depending on the implementation of the system 100 and process 300, collaboration invitations 225, 275 and 285 may be substantially identical, or they may be modified at each collaboration agent 129, 189.

In action 318, user 190 may use terminal 181 to establish voice communication session 270 with terminal 121, either directly using network address 1211, or indirectly via collaboration agent 189 and collaboration agent 129. Establishing, or initiating, voice communication session 270 may include sending an acceptance command, signifying that the user 190 has accepted the invitation, instructing the system 100 to transmit voice communication signals, and instructing terminal 181 to process the transmitted voice signals it receives. The voice session 270 is connected when the system 100 executes the acceptance command. Voice communication session 270 may comprise, for example, three voice communication session parts 271, 272 and 273. Terminal 181 may establish voice communication part 271 with collaboration agent 189. Collaboration agent 189 may establish voice communication part 272 with collaboration agent 129. Collaboration agent 129 may establish voice communication session part 273 with terminal 121.

In action 320, a collaboration call handle 226 may be sent by collaboration agent 129 to terminals 121 and 123. Likewise, collaboration agent 189 may send collaboration call handle 226 to terminals 181 and 183. Collaboration call handle 226 may reference collaboration call 178.

In action 322, terminals 121 and 123 may receive and process collaboration call handle 226. Likewise, terminals 181 and 183 may receive and process collaboration call handle 226.

Receipt of the collaboration call handle 226 enables a user 110, 190 to initiate a second communication session 280 of collaboration call 178, which in process 300 would be a data communication session 280, using the second terminals, here data terminals 123 and 183. Once initiated, the second communication session 280, here data communication session 280, is connected when a collaboration command is executed, here communicating data between terminal 123 and 183.

In action 324, user 110 may instruct terminal 123 to transmit a specified document 119. While user 110 is conversing with user 190 over voice communication session 270, user 110 may want to send a document 119 to user 190. In one embodiment, user 110 may use terminal 123 to enter or select the file name and/or directory location of document 119.

In action 326, terminal 123 may obtain document 119, or a copy thereof. In one embodiment, terminal 123 may obtain document 119 from a storage device, such as a hard disk in terminal 123. In another embodiment, terminal 123 may obtain document 119 from a network.

In action 328, terminal 123 may compose and send a document transmission command 227 to collaboration agent 129. Document transmission command 227 may include collaboration call handle 226. In one embodiment, document transmission command 227 may include document 119.

In action 330, collaboration agent 129 may receive and process document transmission command 227. Collaboration agent 129 may extract collaboration call handle 226 and document 119 from document transmission command 227. Based on collaboration call handle 226 that references collaboration call 178, collaboration agent 129 may determine collaboration agent 189 as the destination for receiving document 119.

In action 332, collaboration agent 129 may compose and send a document transmission command 277. In one embodiment, document transmission command 277 may include document 119. Collaboration agent 129 may send document transmission command 277 to collaboration agent 189.

In action 334, collaboration agent 189 may receive and process document transmission command 277. Collaboration agent 189 may extract document 119 from document transmission command 277. Collaboration agent 189 may select terminal 183 for receiving document 119 based on terminal capabilities list 1833.

In action 336, collaboration agent 189 may compose and send a document transmission command 287. In one embodiment, document transmission command 287 may include document 119. Collaboration agent 189 may send document transmission command 287 to terminal 183.

Although the document transmission commands 227, 277 and 287 are addressed individually for purposes of describing the details of process 300, document transmission commands 227, 277 and 287 may be conceptualized as first, second and third parts of one document transmission command sent from terminal 121 to terminal 181, passing through collaboration agents 129 and 189. Depending on the implementation of the system 100 and process 300, document transmission commands 227, 277 and 287 may be substantially identical, or they may be modified at each collaboration agent 129, 189. Moreover, document transmission commands 227, 277 and 287, and the single "document transmission command" concept, are all variations of a broader concept, the collaboration command, which may be sent between terminals 121 and 181 to perform any of the collaboration functionalities, such as share video, share desktops, text message, etc.

In action 338, terminal 183 may receive and process document transmission command 287. Terminal 183 may extract document 119 from document transmission command 287. In one embodiment, terminal 183 may display document 119 on a graphical display screen of terminal 183. Terminal 123 may display document 119 on another graphical display screen of terminal 123. Users 110 and 190 may discuss document 119 over voice communication session 270.

The following scenario illustrates an exemplary embodiment of the present invention. A first person (user 110) may initiate (action 302) a phone call (collaboration call 178) on a first phone (first voice terminal 121) to a second person (user 190) having a second phone (second voice terminal 181), where the first and second phones 121, 181 are associated with a telecommunications collaboration system 100 according to the present invention. The system 100 recognizes that the phone call 178 is between two system phones 121, 181 and treats the phone call 178 according (e.g., actions 304-314). For example, the phones may be office desk phones within a company network (collaboration network 179).

The second phone 181 rings (e.g., action 316) to notify the second user 190 of the call 178. When the second user 190 answers the phone call 178 using the second phone 181 (e.g., action 318), the system 100 connects the call 178 to the first phone 121 and potentially notifies the first phone 121, the second phone 181, the first user's logged-on desktop computer (first data terminal 123) sitting next to the first phone 121, and the second user's logged-on desktop computer (second data terminal 183) sitting next to the second phone 181, of the collaboration call handle 226 (e.g., action 320).

In processing the call handle 226 (action 322), the each of the two computers 123, 183 may cause a pop-up window to appear on the user's display, advising the user of any collaboration functionalities associated with the collaboration call 178. This pop-up window may function similarly to an IM pop-up and/or a remote assistance pop-up, as examples. For instance, either user may share the other's desktop, send documents to the other user, or text message the other user.

In the above-described process 300, the first user 110 desires to send the second user 190 a document 119. To do this, the first user 110 may select, for example, a "share document" button in the collaboration pop-up and identify the document 119 to be shared (action 324). The system 100 then may share the document 119 (actions 326-336) so that the second user's computer 183 displays the document 119 (action 338) for the second user 190 to view, and possibly edit and/or save, depending on how the document 119 was shared.

Whenever desired, either user 110, 190 may terminate the voice communication session 270 by hanging up the phone and/or terminate the data communication by closing out the collaboration pop-up window. As long as either the voice communication session 270 or the data communication session is active, the collaboration call 178 remains active and either user may be able to reactivate the previously terminated session.

Analogous to having the data communication session active and having terminated the voice communication session 270 is the situation where the first user 110 initiates the data communication session 280 first by sending a collaboration invitation first to the second user's computer 183. Until this point, the data communication-initiated & data communication-based collaboration call 178 resembles an Instant Message. However, because the two computers 123 and 183 are associated with system 100, the collaboration pop-up may allow the users to virtually dial the phones 121, 181 associated with the system 100 to initiate a voice session 270.

Unlike IM-based voice communication, the voice session 270 would be a phone-to-phone call independent of the data communication session. For example, the system 100 may establish the voice session 270 using modified call-back technology (also known as direct inbound dialing), initiated, however, via data session 280 instead of through a phone call, similar in par to Web callback technology. Unlike Web callback technology, though, the system 100 would ring user 110 first and then user 190 second without user 110 needing to dial the phone number of user 190. Such an arrangement resembles a combination of Web callback and operator-assisted dialing.

Although a properly configured version of MS Outlook™ allows a user to dial a person's phone number, if the person and the phone number are stored as a Contact in the Contact folder, this Outlook™-based initiation of a voice session 270 is not associated with a pre-existing data communication session 280. Moreover, even though this Outlook™-based initiation of a voice session 270 is data communication-initiated voice call, it is not a data communication-initiated & data communication-based collaboration call 178 according to the present invention. Rather, the Outlook™-based dialing uses the computer modem to initiate a VoIP call (including a VoIP-to-PSTN call), which means that the computer acts as both the voice terminal and the data terminal in one, which is outside the scope of the present invention. This Outlook™-based dialing scenario requires the user 110 to sign into .Net Messenger Service because the phone call is made from MS Windows Messenger.

In one embodiment, terminal 181 may establish voice communication session 270 using Session Initiation Protocol (SIP). In some embodiments, voice communication session 270 may include a Real-time Transport Protocol (RTP) session. In another embodiment, terminal 181 may establish voice communication session using H.323 protocol.

In one embodiment, terminal 123 may send and receive document 119 using File Transfer Protocol (FTP). For example, terminal 123 may use FTP protocol to send document 119 to collaboration agent 129. In a similar fashion, collaboration agent 129 may use FTP protocol to send document 119 to the recipient, terminal 183. In one embodiment, terminal 123 or 183 may send or receive documents using Hypertext Transfer Protocol (HTTP).

In one embodiment, terminal 123 may use other means to send documents. In one example, document 119 may reside in collaboration network 179, and terminal 123 may include the identity and location of document 119 in document transmission command 227. In one embodiment, collaboration agent 129, as the receiving agent, may retrieve the identified document 119 from collaboration network 179 and send document 119 to terminal 183, the intended recipient.

In one embodiment, collaboration platform 120, 180 may include additional collaboration functionalities, such as video communication, text chat, white-boarding or co-editing of a document. In one embodiment, a terminal 123, 183 may include capabilities to support one or more additional collaboration functionalities. In one example, a terminal 123, 183 may include a video camera to support video communication functionality.

In one embodiment, a collaboration call 178 may involve three or more collaboration platforms 120, 180 in a multiparty conference setting.

In one embodiment, collaboration may be used during a commercial transaction such as an auction, a gaming transaction, such as a card game or a betting game, a ticket order, a price quote, or a product purchase. In another embodiment, collaboration may be used for product or service customer support, a product information inquiry, a service call, and/or service appointment scheduling.

The invention claimed is:

1. A method of collaborating using a telecommunications system, the method comprising:
    transmitting a collaboration call invitation: (i) from a first user first terminal associated with the system to a first user collaboration agent associated with the system, (ii) from the first user collaboration agent to a second user collaboration agent associated with the system, and (iii) from the second user collaboration agent to a second user first terminal associated with the system;

connecting a first communication session if the second user accepts the collaboration call invitation;

automatically transmitting a collaboration call handle from the first user collaboration agent to at least the first user first terminal and a first user second terminal associated with the system upon establishing the first communication session;

transmitting a collaboration command: (i) from the first user second terminal to the first user collaboration agent, (ii) from the first user collaboration agent to the second user collaboration agent, and (iii) from the second user collaboration agent to a second user second terminal associated with the system; and connecting a second communication session between the first user second terminal and the second user second terminal by employing the collaboration command.

2. The method of claim 1, further comprising:
composing the collaboration call invitation at the first user first terminal;
processing the collaboration call handle at the first user second terminal; and
composing the collaboration command at the first user second terminal.

3. The method of claim 1, further comprising:
inviting the second user to communicate with a first user in a first communication session via the second user first terminal;
accepting the collaboration call invitation at the second user first terminal; and
processing the collaboration command at the second user second terminal.

4. The method of claim 1, wherein the first user collaboration agent has a first agent network address, and the second user collaboration agent has a second agent network address; the first user first terminal includes a first user first terminal network address; the second user first terminal includes a second user first terminal network address; the first user second terminal includes a first user second terminal network address; and the second user second terminal includes a second user second terminal network address.

5. The method of claim 4, wherein the first user first terminal network address includes a first telephone number; and the second user first terminal network address includes a second telephone number.

6. The method of claim 4, wherein the collaboration command comprises a collaboration command first part, a collaboration command second part and a collaboration command third part; wherein transmitting the collaboration command comprises:
transmitting the collaboration command first part from the first user second terminal to the first user collaboration agent;
processing the collaboration command first part at the first user collaboration agent;
transmitting the collaboration command second part from the first user collaboration agent to the second user collaboration agent;
processing the collaboration command second part at the second user collaboration agent; and
transmitting the collaboration command third part from the second user collaboration agent to the second user second terminal.

7. The method of claim 4, wherein the collaboration call invitation comprises a collaboration invitation first part, a collaboration invitation second part and a collaboration invitation third part; wherein transmitting the collaboration call invitation comprises:
transmitting the collaboration invitation first part from the first user first terminal to the first user collaboration agent;
processing the collaboration invitation first part at the first user collaboration agent;
transmitting the collaboration invitation second part from the first user collaboration agent to the second user collaboration agent;
processing the collaboration invitation second part at the second user collaboration agent; and
transmitting the collaboration invitation third part from the second user collaboration agent to the second user first terminal.

8. The method of claim 4, wherein:
the first user first terminal includes a first user first terminal capabilities list; the second user first terminal includes a second user first terminal capabilities list; the first user second terminal includes a first user second terminal capabilities list; and the second user second terminal includes a second user second terminal capabilities list; and wherein:
the first user collaboration agent includes the first user first terminal capabilities list and the first user second terminal capabilities list; and the second user collaboration agent includes the second user first terminal capabilities list and the second user second terminal capabilities list.

9. The method of claim 4, wherein:
the system includes a first collaboration platform and a second collaboration platform;
the first collaboration platform includes the first user first terminal, the first user second terminal, and the first user collaboration agent; and
the second collaboration platform includes the second user first terminal, the second user second terminal, and the second user collaboration agent.

10. The method of claim 4, wherein:
the first user collaboration agent comprises the second user collaboration agent; and
the first agent network address comprises the second agent network address.

11. The method of claim 1, wherein the first user first terminal comprises a first voice terminal; the second user first terminal comprises a second voice terminal; the first user second terminal comprises a first data terminal; and the second user second terminal comprises a second data terminal.

12. The method of claim 11, wherein:
the first communication session comprises a voice communication session; and
the second communication session comprises a data communication session.

13. The method of claim 1, wherein the first user first terminal comprises a first data terminal; the second user first terminal comprises a second data terminal and the first communication session comprises a data communication session; the first user second terminal comprises a first voice terminal; the second user second terminal comprises a second voice terminal and the second communication session comprises a voice communication session.

14. A system for collaborating between a first user and a second user using a telecommunications network, the system comprising:
a first user first terminal and a first user second terminal,
a second user first terminal and a second user second terminal, a first user collaboration agent having a first agent network address, the first user collaboration agent being connected to the first user first terminal and the first user second terminal; and a second user collaboration agent having a second agent network address, the second user collaboration agent being connected to the second user first terminal, the second user second terminal, and the first user collaboration agent;

wherein the first user collaboration agent operates to transmit over the network a collaboration call invitation received from the first user first terminal to the second user collaboration agent; the second user collaboration agent operates to transmit the collaboration call invitation received from the first user collaboration agent to the second user first terminal; and the first user collaboration agent operates to connect a first communication session if the second user first terminal accepts the collaboration call invitation;

the first user collaboration agent operates to automatically transmit a collaboration call handle to at least the first user first terminal and the first user second terminal upon acceptance of the collaboration call invitation and a collaboration command received from the first user second terminal to the second user collaboration agent;

the second user collaboration agent operates to transmit the collaboration command received from the first user collaboration agent to the second user second terminal; and the first user collaboration agent operates to connect a second communication session between the first user second terminal and the second user second terminal.

15. The system of claim 14, further comprising:
the first user first terminal having a first user first terminal network address; and
the first user second terminal having a first user second terminal network address;
wherein the first user first terminal is operable to compose the collaboration call invitation and to process the collaboration call handle; and the first user second terminal is operable to process the collaboration call handle and to compose the collaboration command.

16. The system of claim 14, further comprising:
the second user first terminal having a second user first terminal network address; and
the second user second terminal having a second user second terminal network address
wherein the second user first terminal is operable to invite the second user to communicate with a first user in a first communication session and to accept the collaboration call invitation; and the second user second terminal is operable to process the collaboration command.

17. The system of claim 16, wherein the second user first terminal network address includes a second telephone number.

18. The system of claim 14, wherein the collaboration command comprises a collaboration command first part, a collaboration command second part and a collaboration command third part; wherein to transmit the collaboration command comprises:
to transmit the collaboration command first part from the first user second terminal to the first user collaboration agent;
to process the collaboration command first part at the first user collaboration agent;
to transmit the collaboration command second part from the first user collaboration agent to the second user collaboration agent;
to process the collaboration command second part at the second user collaboration agent; and
to transmit the collaboration command third part from the second user collaboration agent to the second user second terminal.

19. The system of claim 14, wherein the collaboration call invitation comprises a collaboration invitation first part, a collaboration invitation second part and a collaboration invitation third part; wherein to transmit the collaboration call invitation comprises:
to transmit the collaboration invitation first part from the first user first terminal to the first user collaboration agent;
to process the collaboration invitation first part at the first user collaboration agent;
to transmit the collaboration invitation second part from the first user collaboration agent; and
to transmit the collaboration invitation third part from the second user collaboration agent to the second user first terminal.

20. The system of claim 14, wherein:
the first user first terminal includes a first user first terminal capabilities list; the second user first terminal includes a second user first terminal capabilities list; the first user second terminal includes a first user second terminal capabilities list; and the second user second terminal includes a second user second terminal capabilities list; and wherein:
the first user collaboration agent includes the first user first terminal capabilities list and the first user second terminal capabilities list; and the second user collaboration agent includes the second user first terminal capabilities list and the second user second terminal capabilities list.

21. The system of claim 14, further comprising:
a first collaboration platform; and
a second collaboration platform;
wherein the first collaboration platform includes the first user first terminal, the first user second terminal, and the first user collaboration agent; and
the second collaboration platform includes the second user first terminal, the second user second terminal, and the second user collaboration agent.

22. The system of claim 14, wherein:
the first user collaboration agent comprises the second user collaboration agent; and the first agent network address comprises the second agent network address.

23. The system of claim 14, wherein the first user first terminal comprises a first voice terminal; the second user first terminal comprises a second voice terminal; the first user second terminal comprises a first data terminal; and the second user second terminal comprises a second data terminal.

24. The system of claim 23, wherein:
the first communication session comprises a voice communication session; and
the second communication session comprises a data communication session.

25. The system of claim 14, wherein the first user first terminal comprises a first data terminal; the second user first terminal comprises a second data terminal; the first user second terminal comprises a first voice terminal; and the second user second terminal comprises a second voice terminal.

26. The system of claim 25, wherein:
the first communication session comprises a data communication session; and the second communication session comprises a voice communication session.

27. A computer program product tangibly stored on a non-transitory computer usable medium and containing instructions operable to cause a computer to perform actions of claim 1.

28. A system for collaborating between a first user and a second user using a telecommunications network, the system comprising:
- a processor executing a user collaboration agent having a network address and connected to at least a first user first terminal, a first user second terminal, a second user first terminal and a second user second terminal wherein:
  - the collaboration agent receives a collaboration call invitation from the first user first terminal via a collaboration number input, and transmits the collaboration call invitation over the network to the second user first terminal and connects a first communication session between the first user first terminal and the second user first terminal if the second user first terminal accepts the collaboration call invitation;
  - the collaboration agent further establishes a second communication session between the first user second terminal and the second user second terminal upon the acceptance of the collaboration call invitation by automatically transmitting a collaboration call handle to at least the first user first terminal and the first user second terminal and a collaboration command received from the first user second terminal to the second user second terminal;

and a memory comprising associations between a plurality of collaboration numbers and respective collaboration agents.

* * * * *